(12) United States Patent
Hah

(10) Patent No.: US 11,788,641 B1
(45) Date of Patent: Oct. 17, 2023

(54) COMBINATION STRUCTURE OF ELECTRONIC WATER VALVE

(71) Applicant: Useong R&D Co., Ltd., Anyang-si (KR)

(72) Inventor: Soo-cheol Hah, Changwon-si (KR)

(73) Assignee: USEONG R&D CO., LTD., Anyang-si (KR)

( * ) Notice: Subject to any disclaimer, the term of this patent is extended or adjusted under 35 U.S.C. 154(b) by 0 days.

(21) Appl. No.: 17/896,652

(22) Filed: Aug. 26, 2022

(30) Foreign Application Priority Data

Jul. 15, 2022 (KR) .......................... 10-2022-0087283

(51) Int. Cl.
  *F16K 27/10* (2006.01)
  *F16K 7/14* (2006.01)
  *F16K 31/06* (2006.01)

(52) U.S. Cl.
  CPC ................ *F16K 27/10* (2013.01); *F16K 7/14* (2013.01); *F16K 31/0672* (2013.01)

(58) Field of Classification Search
  CPC ........ F16K 27/10; F16K 7/14; F16K 31/0672; F16K 27/00–107; Y10T 137/0491; Y10T 137/5987; Y10T 403/60; Y10T 403/606; H01R 13/6272; H01R 13/641; F16H 59/0213
  USPC .................... 251/335.2, 331, 129.01–129.22
  See application file for complete search history.

(56) References Cited

U.S. PATENT DOCUMENTS

| | | | | |
|---|---|---|---|---|
| 5,685,743 A * | 11/1997 | Schmidt | ............ | H01R 13/6272 439/417 |
| 5,848,855 A * | 12/1998 | Roossien | ............ | F16H 59/0213 403/329 |
| 6,059,598 A * | 5/2000 | Yamashita | ......... | H01R 13/6272 439/352 |
| 6,269,834 B1 * | 8/2001 | Huhnen | ............. | F15B 13/0817 137/884 |
| 6,684,901 B1 * | 2/2004 | Cahill | ................. | F16K 31/0655 251/291 |
| 6,820,651 B2 * | 11/2004 | Seuret | .................. | F15B 13/044 137/596.17 |
| 8,267,375 B1 * | 9/2012 | LaHousse | ........... | F15B 13/0405 403/381 |

(Continued)

FOREIGN PATENT DOCUMENTS

KR    20170118352    10/2017

*Primary Examiner* — Craig J Price
(74) *Attorney, Agent, or Firm* — CANTOR COLBURN LLP

(57) ABSTRACT

Provided is a combination structure of an electronic water valve including an electromagnetic unit including a coil body and a yoke having an upper support plate and a lower support plate and which includes a valve body including an upper member and a lower member. The combination structure includes a locking long hole formed in each of opposite sides of the lower support plate, an elastic pressing rod that protrudes, a protrusion locking rod formed on each of opposite sides of an upper portion of the upper member, and a burr blocking member which is formed on an outer circumference of the upper member and which prevents a welding burr from being exposed to an outside of an outer circumference of the valve body through a gap of a friction welding portion, the welding burr being generated when friction welding of the upper member and the lower member is performed.

4 Claims, 6 Drawing Sheets

(56) References Cited

U.S. PATENT DOCUMENTS

| | | | |
|---|---|---|---|
| 9,228,669 B2* | 1/2016 | Iwata | F16K 27/0236 |
| 9,249,895 B2* | 2/2016 | Hettinger | F16K 31/082 |
| 9,964,220 B1* | 5/2018 | Ro | F16K 31/0675 |
| 10,072,764 B2* | 9/2018 | No | F16K 31/06 |
| 10,080,502 B2* | 9/2018 | Sano | A61B 5/0235 |
| 10,544,874 B2* | 1/2020 | Hentschel | F16K 27/029 |
| 11,112,025 B2* | 9/2021 | Bartow | F16K 7/17 |
| 11,296,449 B2* | 4/2022 | Menzies | H01R 13/506 |

\* cited by examiner

COMBINATION STRUCTURE OF ELECTRONIC WATER VALVE

BACKGROUND OF THE INVENTION

Field of the Invention

The present disclosure relates to a combination structure of an electronic water valve. More particularly, the present disclosure relates to a combination structure of an electronic water valve in which a valve body and an electromagnetic unit are capable of being easily assembled by simplifying a combination structure of the electromagnetic unit.

Description of the Related Art

Generally, an electromagnetic water valve (hereinafter, referred to as an "electronic water valve"), which performs a desired opening and closing operation by a magnetic force generated when a current is applied, is widely applied and used mainly in an electronic product such as a washing machine, a dishwasher, a refrigerator, a coffee vending machine, and so on so as to control water supply function of the electronic product.

Such an electronic water valve is largely divided into and includes a valve body and an electromagnetic unit, and the valve body of the electronic water valve composed as described above is divided into an upper portion and a lower portion. Furthermore, the valve body includes an upper member formed in a cap shape, and includes a lower member provided with a water inlet, a water outlet, and a valve seat that is provided at an inner center portion of the lower member. In addition, between the upper member and the lower member, a diaphragm which divides an upper space and a lower space and which is elastically mounted by using a restoring element is provided.

In addition, the electromagnetic unit includes a coil body, and includes a yoke which is formed in a channel-shaped steel beam and which is positioned at a circumference of the coil body, the yoke being a support structure which includes a bottom surface, a connection rod, and a support surface and which forms a magnetic field circuit. Furthermore, the electromagnetic unit is mounted on an upper surface of the valve body.

In the electronic water valve composed as described above, the diaphragm is moved according to a plunger which penetrates and which is mounted between the valve body and the electromagnetic unit and which is moved up and down by the magnetic force generated from the coil body of the electromagnetic unit that is driven by an electrical signal, so that the valve seat is opened and closed, thereby controlling a predetermined water supply function.

In addition, in a conventional electronic water valve, the valve body divided into two parts and the electromagnetic unit are combined. Furthermore, as a conventional combination structure of the valve body and the electromagnetic unit, various combination structures have been developed and used.

Accordingly, as an example of the combination structure of the valve body and the electromagnetic unit of the conventional electronic water valve, a rotary combination structure (hereinafter, referred to as "conventional rotary combination structure") has been known.

The conventional rotary combination structure is provided with a male hook that vertically protrudes on each of opposite sides of an upper surface of the valve body, and is provided with a female combining portion which is formed in each of opposite sides of the bottom surface of the yoke of the electromagnetic unit and which includes a passing section where the male hook is passing in and out and a locking section. Furthermore, the electromagnetic unit is placed on the upper portion of the valve body, and the electromagnetic unit is rotated in left and right directions so that the male hook and the female combining portion are fitted with each other, so that the valve body and the electromagnetic unit are combined.

In addition, after the male hook and the female combining portion that compose the conventional rotary combination structure are fitted with each other and are combined, a fastening pin is fastened such that the fastening pin penetrates in an intersecting direction of the left and right rotation directions when the valve body and the yoke of the electromagnetic unit are combined, thereby preventing the male hook from being separated from the locking section of the female combining portion.

Therefore, in the conventional rotary combination structure, since the fastening pin is required to be fastened after the male hook and the female combining portion are fitted with each other, double working that is a rotary combination work and fastening work of the fastening pin is required to be performed when the valve body and the electromagnetic unit are combined. Accordingly, there is a problem that productivity is reduced due to the large number of processes during combining work, and there is a problem that manufacturing cost of a valve is increased since the number of components required to perform the combining work is increased.

In addition, in the conventional rotary combination structure, due to an assembly tolerance when the combining work is performed, the electromagnetic unit is slightly moved on the upper portion of the valve body in a vertical direction, so that a combined state is not rigid. Therefore, there is a problem that reliability of a product is decreased, such as frequent breakdown of the product.

DOCUMENT OF RELATED ART (Patent Document 0001) Korean Patent Application Publication No. 10-2017-0118352

SUMMARY OF THE INVENTION

Accordingly, the present disclosure has been made keeping in mind the above problems occurring in the related art.

An objective of the present disclosure is to provide a combination structure of an electronic water valve in which a combination structure of a valve body and an electromagnetic unit is simplified and the electromagnetic unit is rigidly combined on an upper portion of the valve body, thereby being capable of preventing the electromagnetic unit from being separated while the electronic water valve is used.

In addition, another objective of the present disclosure is to provide a combination structure of an electronic water valve capable of preventing a welding burr from being exposed to an outside of an outer circumference of the valve body through a gap of a friction welding portion, the welding burr being generated when friction welding of an upper member and a lower member that compose the valve body is performed, the gap being formed between the upper member and the lower member.

In order to achieve the above objectives, there is provided a combination structure of an electronic water valve, in which the electronic water valve includes: an electromagnetic unit including a coil body and a yoke that has an upper support plate and a lower support plate; and a valve body including an upper member formed in a cap shape and a lower member provided with a water inlet, a water outlet, a valve seat, and a diaphragm, the combination structure including: a locking long hole formed long in front and rear directions in each of opposite sides of the lower support plate that composes the yoke of the electromagnetic unit; an elastic pressing rod that protrudes such that the elastic pressing rod is inclined upward toward an outside of the locking long hole from a lower inner cross-section of the locking long hole; a protrusion locking rod formed on each of opposite sides of an upper portion of the upper member that composes the valve body such that the protrusion locking rod penetrates and is inserted into the locking long hole, the protrusion locking rod being configured such that an outside of an upper portion of the protrusion locking rod is provided with a locking protrusion portion that is locked on an upper surface around an outside of the locking long hole while the protrusion locking rod is in a state in which the protrusion locking rod penetrates the locking long hole, and the protrusion locking rod being configured such that an upper portion of the elastic pressing rod presses an inner surface of the protrusion locking rod with an elastic restoring force and the protrusion locking rod is in close contact with the elastic pressing rod while the protrusion locking rod is in the state in which the protrusion locking rod penetrates the locking long hole so that the protrusion locking rod is prevented from being separated; and a burr blocking means which is formed on an outer circumference of the upper member and which prevents a welding burr from being exposed to an outside of an outer circumference of the valve body through a gap of a friction welding portion, the welding burr being generated when friction welding of the upper member and the lower member that compose the valve body is performed, the gap being formed between the upper member and the lower member.

In the present disclosure composed as described above, as the combination structure of the valve body and the electromagnetic unit is simplified, the valve body and the electromagnetic unit are easily combined quickly in a single process when combining work of the valve body and the electromagnetic unit is performed, so that the productivity of the product may be increased. Furthermore, there is an advantage that the manufacturing cost of the electronic water valve may be reduced by reducing the manufacturing cost of the combination structure of the valve body and the electromagnetic unit.

In addition, in the present disclosure, as the electromagnetic unit is rigidly combined on the upper portion of the valve body, the electromagnetic unit is prevented from being separated while the electronic water valve is used, so that there is an advantage that the electronic water valve in which the reliability is secured is provided.

In addition, in the present disclosure, since the welding burr generated when the friction welding of the upper member and the lower member that compose the valve body is prevented from being exposed to the outside of the outer circumference of the valve body through the gap of the friction welding portion, the gap being formed between the upper member and the lower member, there is an advantage that work of removing the welding burr on the outer circumference of the valve body after the work of welding the upper member and the lower member is not required to be performed.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 5A and 5B are views schematically illustrating a combining process of the combination structure according to the present disclosure, in which FIG. 5A is a view illustrating a state in which an electromagnetic unit is separated from a valve body and FIG. 5B is a view illustrating a process in which the electromagnetic unit is combined on the valve body.

DETAILED DESCRIPTION OF THE INVENTION

Hereinafter, an exemplary embodiment of the present disclosure will be described in more detail with reference to the accompanying drawings. However, it should be understood that the present disclosure may be implemented in a variety of different forms, and is not limited to the described embodiment.

Figure 1:
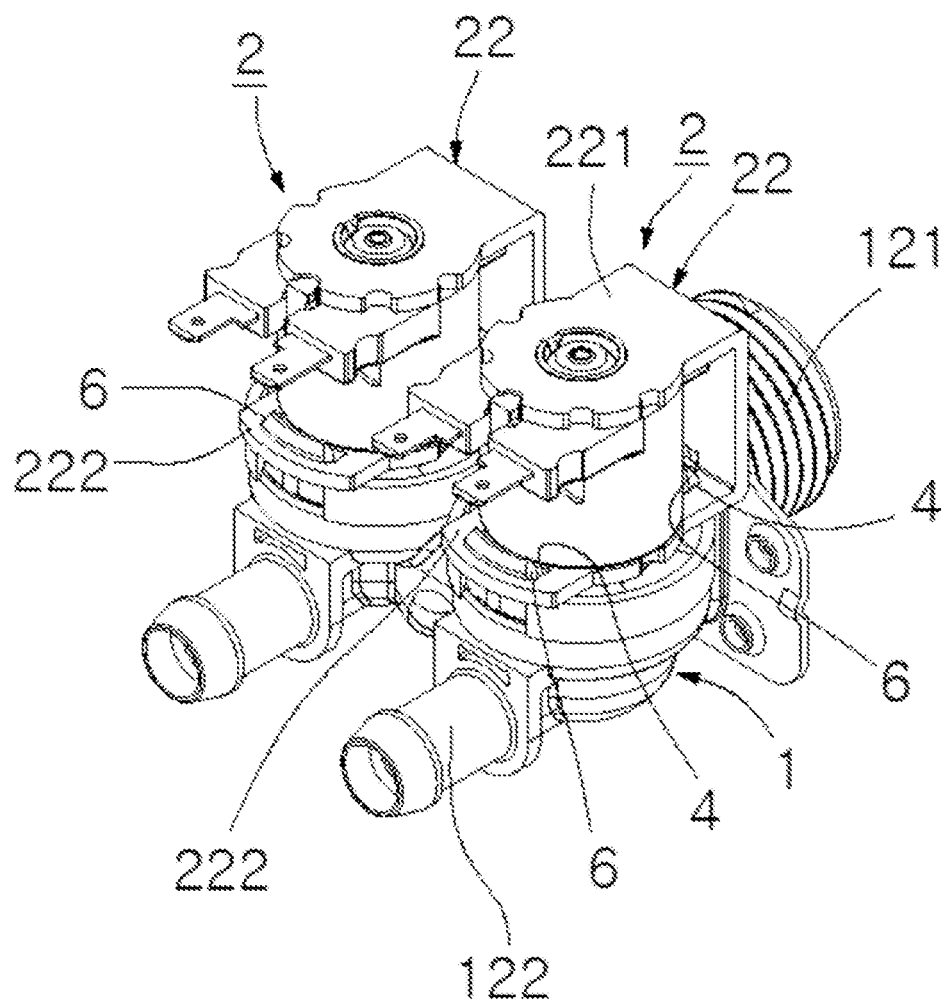
FIG. 1 is a perspective view illustrating an electronic water valve in which a combination structure according to the present disclosure is applied.
Figure 2:
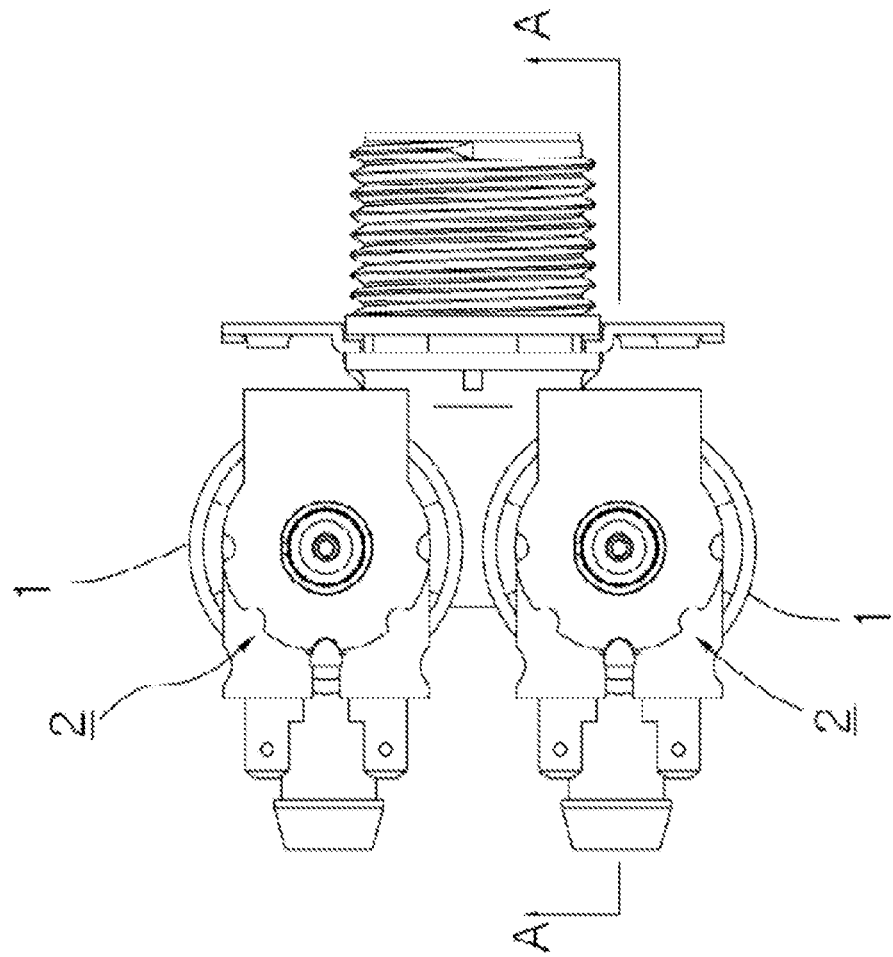
FIG. 2 is a plan view illustrating the electronic water valve in which the combination structure according to the present disclosure is applied.
Figure 3:
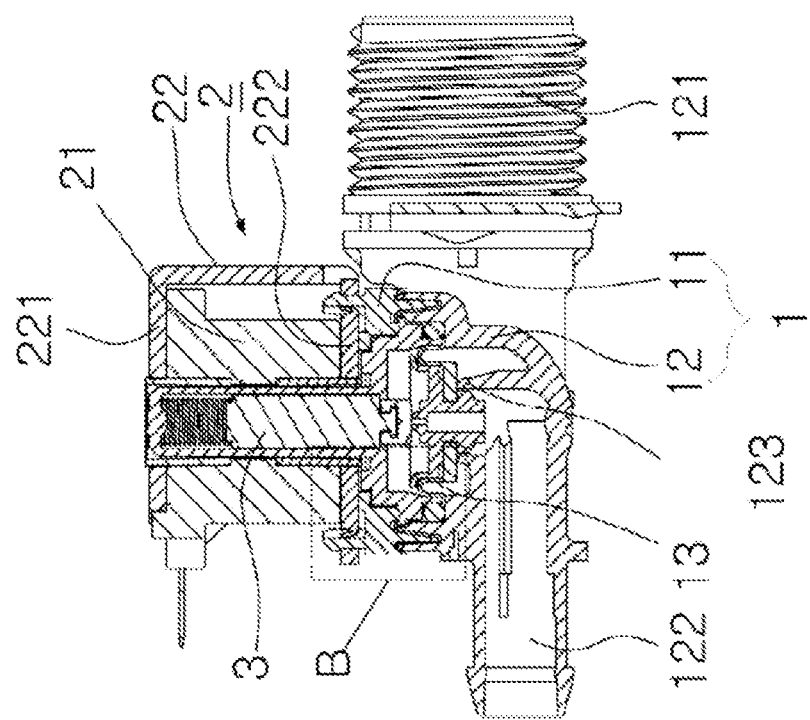
FIG. 3 is a cross-sectional view taken along line A-A in FIG. 2.
Figure 4:
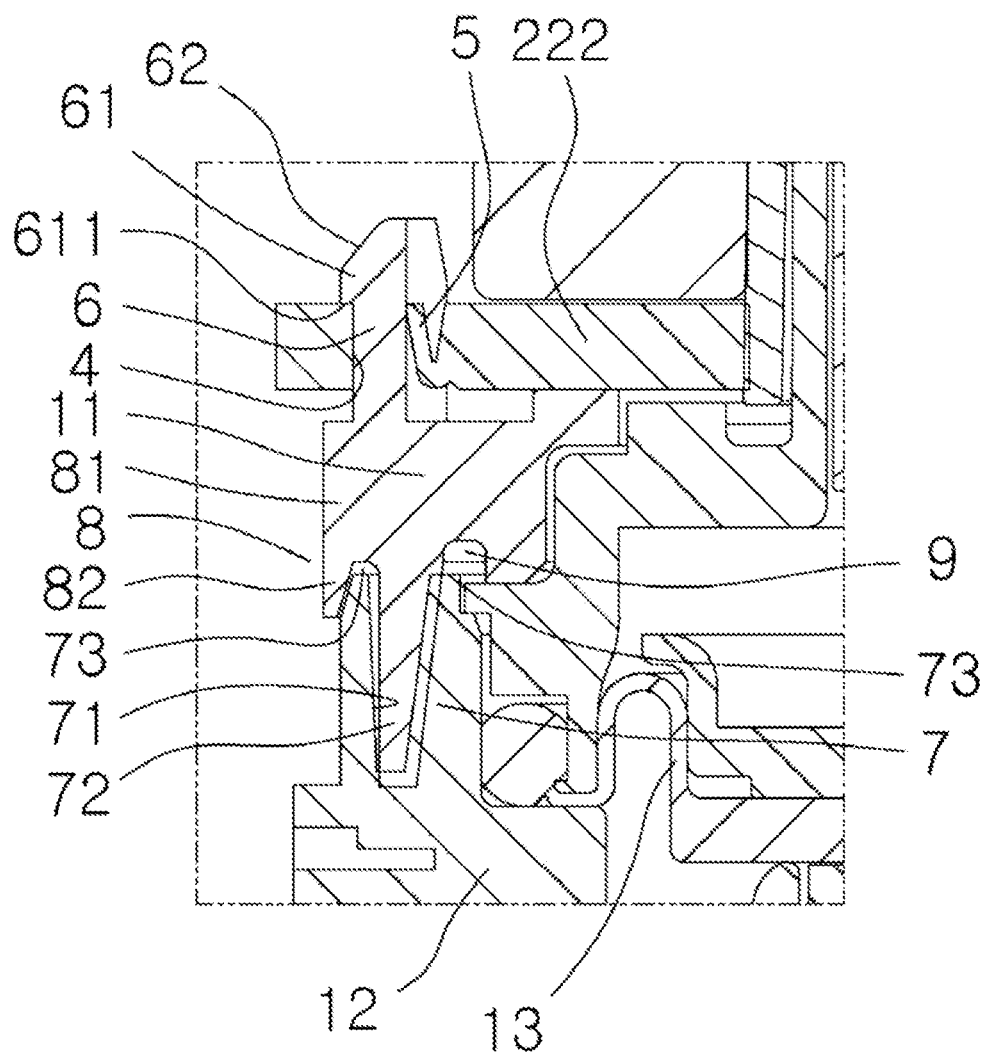
FIG. 4 is an enlarged view illustrating a portion B in FIG. 3.
Figure 5A:
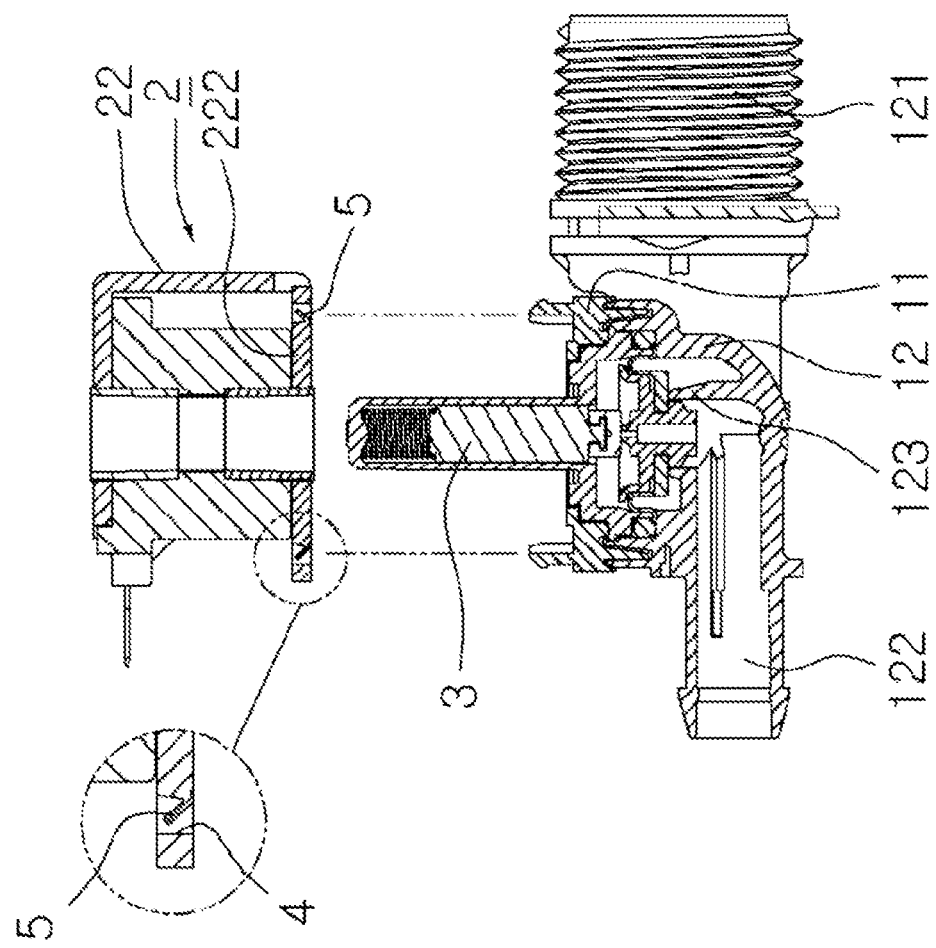
Figure 5B:
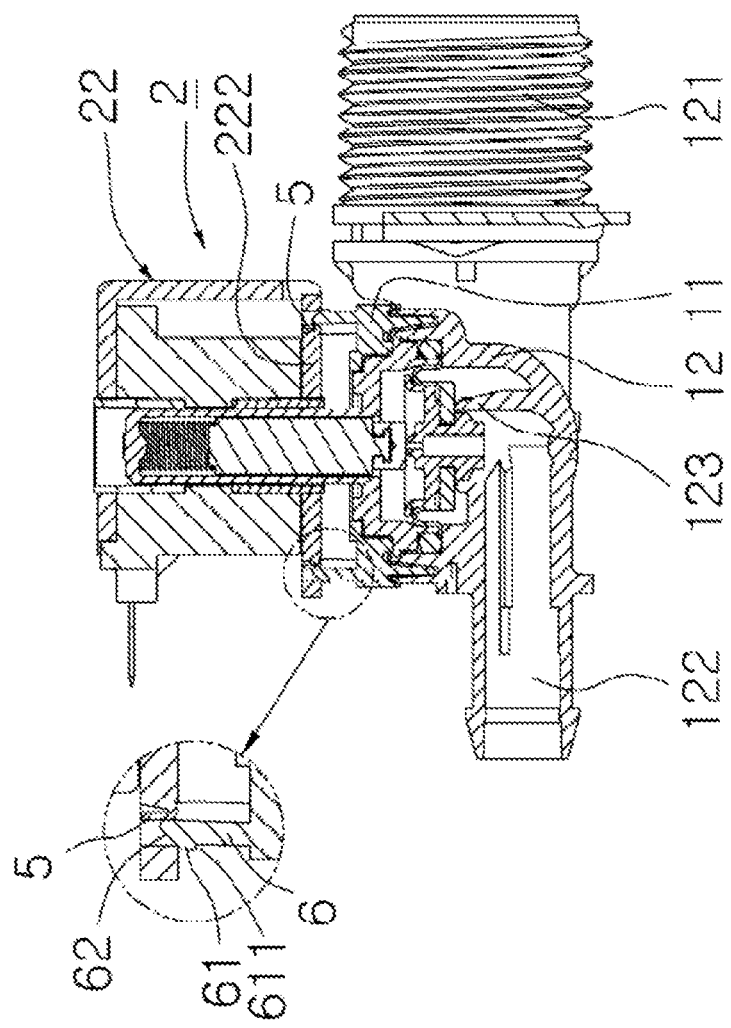

FIG. 1 is a perspective view illustrating an electronic water valve in which a combination structure according to the present disclosure is applied, FIG. 2 is a plan view illustrating the electronic water valve in which the combination structure according to the present disclosure is applied, FIG. 3 is a cross-sectional view taken along line A-A in FIG. 2, FIG. 4 is an enlarged view illustrating a portion B in FIG. 3, and FIGS. 5A and 5B are views schematically illustrating a combining process of the combination structure according to the present disclosure.

First, as illustrated in the drawings, a combination structure of an electronic water valve according to the present disclosure is provided in an electronic water valve that includes an electromagnetic unit 2, a valve body 1, and a plunger 3.

The electromagnetic unit 2 includes a coil body 21, and includes a yoke 22 formed in a channel-shaped steel beam. Furthermore, the yoke 22 is formed of a connecting rod vertically mounted on a circumference of the coil body 21, is formed of an upper support plate 221 and a lower support plate 222 that are formed in disc shapes, and is a support structure that also forms a magnetic field circuit. Such an electromagnetic unit 2 is already known.

The valve body 1 is formed of an upper member 11 formed in a cap shape, and is formed of a lower member 12 provided with a water inlet 121, a water outlet 122, and a valve seat 123 that is positioned at an inner center portion of the lower member 12. Furthermore, a diaphragm 13 configured to open and close the valve seat 123 is mounted in an inner portion of the valve body 1. Such a valve body 1 is already known.

The plunger 3 is mounted vertically through inner portions of the valve body 1 and the electromagnetic unit 2 while the valve body 1 and the electromagnetic unit 2 are facing each other and are in a coupled state, and is configured to move up and down by a magnetic force generated in the coil body 21. Furthermore, the plunger 3 serves to open and close the valve seat 123 by operating the diaphragm 13. Such a plunger 3 is already known.

Particularly, the combination structure of the electronic water valve according to the present disclosure may be provided in an electronic water valve in which one electromagnetic unit 2 is mounted in one valve body 1 that has one water inlet 121 and one water outlet 122, or may be provided in an electronic water valve in which two electromagnetic units 2 are mounted in one valve body 1 that has one water inlet 121 and two water outlet 122. In the accompanying drawings, a state in which the combination structure of the electronic water valve according to the present disclosure is provided in the electronic water valve where two electromagnetic units 2 are mounted in one valve body 1 is illustrated.

Therefore, the combination structure of the electronic water valve according to the present disclosure is provided in the electronic water valve that includes the electromagnetic unit 2, the valve body 1, and the plunger 3 that are described above, and includes a locking long hole 4, an elastic pressing rod 5, and a protrusion locking rod 6.

The locking long hole 4 which is formed long in front and rear directions is formed in each of opposite sides of the lower support plate 222 of the yoke 22 that composes the electromagnetic unit 2 of the electronic water valve. In addition, the locking long hole 4 may be formed in a circular arc shape that is formed long in the front and rear directions, or may be formed in a rectilinear shape that is formed long in the front and rear directions. In the accompanying drawings, the locking long hole 4 formed in the circular arc shape is illustrated.

The elastic pressing rod 5 is formed such that the elastic pressing rods 5 protrude and are inclined upward toward the outside from lower portions of inner cross-sections of the locking long holes 4, respectively. More particularly, the elastic pressing rod 5 is formed in a rectangular plate shape that is integrally connected to the lower portion of the inner cross-section of the locking long hole 4. Furthermore, the elastic pressing rod 5 is capable of pressing an inner side surface of the protrusion locking rod 6, which will be described later, with an elastic restoring force since an upper portion of the elastic pressing rod 5 of the elastic pressing rod 5 is capable of being elastically moved in left and right directions around a lower portion of the elastic pressing rod 5, and the detailed description thereof will be described later.

The protrusion locking rod 6 is formed such that the protrusion locking rod 6 penetrates and is inserted into the locking long hole 4 positioned at each of the opposite sides of the upper member 11 that composes the valve body 1 of the electronic water valve. In addition, on an upper outer side of each of the protrusion locking rods 6, a locking protrusion portion 61 which is locked on an upper surface around the outside of the locking long hole 4 while each of the protrusion locking rods 6 is in a state in which each of the protrusion locking rods 6 penetrates the locking long hole 4 is formed. In addition, when each of the protrusion locking rods 6 is in a state in which each of the protrusion locking rods 6 penetrates the locking long hole 4 and is coupled to the locking long hole 4, the upper portion of the elastic pressing rod 5 presses the inner side surface of the protrusion locking rod 6 with the elastic restoring force and is in close contact with the protrusion locking rod 6 so that the protrusion locking rod 6 is prevented from being separated.

According to the shape of the locking long hole 4, the protrusion locking rod 6 may be formed in a circular arc shape that protrudes long in the front and rear directions when the locking long hole 4 is formed in the circular arc shape, and the protrusion locking rod 6 may be formed in a rectilinear shape that protrudes long in the front and rear directions when the locking long hole 4 is formed in the rectilinear shape. In the accompanying drawings, the protrusion locking rod 6 which is in a state in which the protrusion locking rod 6 protrudes such that the circular arc shape is formed is illustrated.

Preferably, at the lower portion of the locking protrusion portion 61, a horizontal surface 611 that is rigidly and closely locked on the upper surface around the outside of the locking long hole 4 while the protrusion locking rod 6 is in a state in which the protrusion locking rod 6 penetrates the locking long hole 4 is formed.

Preferably, in order for the protrusion locking rod 6 to be smoothly inserted into the locking long hole 4, an inclined surface 62 which is inclined downward toward the outside from an inside of an upper portion of the protrusion locking rod 6 is formed at the upper portion of the protrusion locking rod 6 including the locking protrusion portion 61.

Hereinafter, a process in which the electromagnetic unit 2 is assembled and combined with the valve body 1 by using the combination structure of the electronic water valve according to the present disclosure will be described as follows.

As illustrated in FIGS. 1 to 5B, when the electromagnetic unit 2 is assembled to the upper portion of the valve body 1 that composes the electronic water valve, a process in which an assembler holds the electromagnetic unit 2 with one hand and the electromagnetic unit 2 is positioned on the upper portion of the valve body 1 and then the electromagnetic unit 2 is moved downward from the upper portion of the valve body 1 is performed, and the protrusion locking rods 6 formed on the opposite sides of the valve body 1 penetrate and are inserted into the locking long holes 4 that are formed in the opposite sides of the lower support plate 22 of the electromagnetic unit 2, thereby finishing assembling of the electromagnetic unit 2 with the valve body 1.

More specifically, in the process in which the assembler holds the electromagnetic unit 2 with one hand and moves the electromagnetic unit 2 downward from the upper portion of the valve body 1 as described above, during a process in which the locking protrusion portion 61 of the protrusion locking rod 6 is passing from a lower portion of the locking long hole 4 to the upper portion of the locking long hole 4, the upper portion of the elastic pressing rod 5 connected to the lower portion of the inner cross-section of the locking long hole 4 is rotated and moved to the inside from the lower portion thereof as illustrated in FIG. 5B, so that the locking protrusion portion 61 of the protrusion locking rod 6 is capable of passing through the locking long hole 4.

In addition, since the process in which the assembler holds the electromagnetic unit 2 with one hand and moves the electromagnetic unit 2 downward from the upper portion of the valve body 1 is finished, the horizontal surface 611 of the locking protrusion portion 61 that composes the protrusion locking rod 6 is locked on the outside around the locking hole 4 such that the horizontal surface 611 is in close contact with the outside around the locking hole 4. Then, as the upper portion of the elastic pressing rod 5 connected to the lower portion of the inner cross-section of the locking long hole 4 is rotated and moved to the outside around the lower portion of the elastic pressing rod 5 by the elastic restoring force, the inner side surface of the protrusion locking rod 6 is pressed by the upper portion of the elastic pressing rod 5 toward the outside with the elastic restoring force.

Accordingly, in the present disclosure, the combination structure of electromagnetic unit 2 and the valve body 1 is simplified to the protrusion locking rod 6 and the locking long hole 4 that is provided with the elastic pressing rod 5. Therefore, the valve body 1 and the electromagnetic unit 2 may be easily combined quickly in one process when the valve body 1 and the electromagnetic unit 2 are combined, and manufacturing cost of the combination structure of the valve body 1 and the electromagnetic unit 2 may be reduced, so that the present disclosure is useful.

In addition, in the present disclosure, in the state in which the electromagnetic unit 2 is combined with the valve body 1, the inner side surface of each of the protrusion locking rods 6 that is locked and assembled to each of the locking long holes 4 by penetrating each of the locking long holes 4 is pressed by the upper portion of each of the elastic pressing rods 5 toward the outside with the elastic restoring force, so that the electromagnetic unit 2 may be rigidly combined to the upper portion of the valve body 1. Therefore, even if vibration of the electronic water valve occurs or external shock is applied to the electronic water valve when the electronic water valve is used, reliability of preventing the electromagnetic unit 2 from being separated is secured, so that the present disclosure is useful.

In addition, in the present disclosure, as each of the protrusion locking rods 6 is locked on and fixed to each of the locking long holes 4, the electromagnetic unit 2 is rigidly combined to the upper portion of the valve body 1 without moving in a vertical direction.

In addition, as illustrated in FIGS. 3 and 4, the combination structure of the electronic water valve according to the present disclosure may further include a burr blocking means 8 which is formed on an outer circumference of the upper member 11 and which blocks a welding burr from being exposed to the outside of an outer circumference of the upper member 11 through a gap 73 of a friction welding portion 7, the gap 73 being formed between the upper member 11 and the lower member 12, the welding burr being generated when friction welding of the upper member 11 and the lower member 12 that composes the valve body 1 is performed.

First, the friction welding portion 7 includes a recessed groove 71 which is recessively formed on an upper circumferential surface of the lower member 12 and which has an inner side surface where a first inclined welding surface that is inclined upward to the inside from a lower portion thereof is formed, a protrusion connection portion 72 which is formed on a lower circumferential surface of the upper member 11 such that the protrusion connection portion 72 is inserted into the recessed groove 71 and which has an inner side surface where a second inclined welding surface that is friction welded on the first inclined welding surface is formed, and the gap 73 formed between the upper member 11 and the lower member 12.

The burr blocking means 8 may include a circumference expansion portion 81 that protrudes toward the outside from the outer circumference of the upper member 11, and a protrusion blocking portion 82 which protrudes downward from the lower portion of the circumference expansion portion 81 and which covering the outside of the gap 73 that is formed between the upper member 11 and the lower member 12, thereby blocking the welding burr from being exposed to the outside.

Therefore, in the present disclosure, the welding burr generated when the friction welding of the upper member 11 and the lower member 12 that composes the valve body 1 is performed is prevented from being exposed to the outside of the outer circumference of the valve body 1 through the gap 73 of the friction welding portion 7, the gap 73 being formed between the upper member 11 and the lower member 12, so that the present disclosure has an advantage that work of removing the welding burr on the outer circumference of the valve body 1 after the work of welding the upper member 11 and the lower member 12 is finished is not required to be performed.

In addition, the upper member 11 may further include a burr collecting groove 9 formed in an upper inner side of an inner side surface of the protrusion connection portion 72 such that the collecting groove 9 is recessed upward, the upper inner side being the lower circumferential surface of the upper member 11, the burr collecting groove 9 collecting the welding burr which is generated when the friction welding is performed and which is moved upward, and the burr collecting groove 9 preventing the welding burr from being discharged to the upper portion of the valve body 1 through the gap 73 of the friction welding portion 7.

Therefore, as the welding burr is prevented from being discharged and exposed to the upper portion of the valve body 1 through the gap 73 of the friction welding portion 7, the present disclosure has an advantage that the work of removing the welding burr on the upper portion of the valve body 1 after the work of welding the upper member 11 and the lower member 12 is finished is not required to be performed.

Although the exemplary embodiment of the present disclosure has been described above, the present disclosure may use various changes, modifications, and equivalents. It is apparent that the present disclosure can be equally applied by appropriately modifying the embodiment described above. Therefore, the above description does not limit the scope of the present disclosure determined by the limit of the appended claims.

Meanwhile, in the detailed description of the present disclosure, specific exemplary embodiment has been described, but it will be apparent to those of ordinary skill in the art that various modifications can be made without departing from the scope of the present disclosure.

What is claimed is:

1. A combination structure of an electronic water valve, in which the electronic water valve comprises:
   an electromagnetic unit comprising a coil body and a yoke that has an upper support plate and a lower support plate; and
   a valve body comprising an upper member formed in a cap shape and a lower member provided with a water inlet, a water outlet, a valve seat, and a diaphragm,
   the combination structure comprising:
   a locking long hole formed long in front and rear directions in each of opposite sides of the lower support plate that composes the yoke of the electromagnetic unit;
   an elastic pressing rod that protrudes such that the elastic pressing rod is inclined upward toward an outside of the locking long hole from a lower inner cross-section of the locking long hole;
   a protrusion locking rod formed on each of opposite sides of an upper portion of the upper member that composes the valve body such that the protrusion locking rod penetrates and is inserted into the locking long hole, the protrusion locking rod being configured such that an outside of an upper portion of the protrusion locking rod is provided with a locking protrusion portion that is locked on an upper surface around an outside of the locking long hole while the protrusion locking rod is in a state in which the protrusion locking rod penetrates the locking long hole, and the protrusion locking rod being configured such that an upper portion of the elastic pressing rod presses an inner surface of the protrusion locking rod with an elastic restoring force and the protrusion locking rod is in close contact with the elastic pressing rod while the protrusion locking rod is in the state in which the protrusion locking rod penetrates the locking long hole so that the protrusion locking rod is prevented from being separated; and a burr blocking means which is formed on an outer circumference of the upper member and which prevents a welding burr from being exposed to an outside of an outer circumference of the valve body through a gap of a friction welding portion, the welding burr being generated when friction welding of the upper member and the lower member that compose the valve body is performed, the gap being formed between the upper member and the lower member.

2. The combination structure of the electronic water valve of claim 1, wherein a lower portion of the locking protrusion portion has a horizontal surface such that the protrusion locking rod is locked on and is in close contact with the upper surface around the outside of the locking long hole while the protrusion locking rod is in the state in which the protrusion locking rod penetrates the locking long hole, and the upper portion of the protrusion locking rod that comprises the locking protrusion portion has an inclined surface that is inclined downward toward the outside of the upper portion of the protrusion locking rod from an inside of the upper portion of the protrusion locking rod.

3. The combination structure of the electronic water valve of claim 1, wherein the friction welding portion comprises:

a recessed groove which is recessively formed in a circumference of an upper surface of the lower member and which has an inner surface provided with a first inclined welding surface that is inclined upward to an inside of the recessed groove from a lower portion of the recessed groove;

a protrusion connection portion which is formed on a circumference of a lower surface of the upper member such that the protrusion connection portion is inserted into the recessed groove and which has an inner surface provided with a second inclined welding surface that is friction welded on the first inclined welding surface; and the gap formed between the upper member and the lower member, wherein the burr blocking means comprises:

a circumference expansion portion that protrudes outward from the outer circumference of the upper member; and a protrusion blocking portion which protrudes downward from a lower portion of the circumference expansion portion and which covers an outside of the gap that is formed between the upper member and the lower member, thereby preventing the welding burr from being exposed outside.

4. The combination structure of the electronic water valve of claim 3, wherein the upper member further comprises a burr collecting groove which is formed in an upper portion inside the inner surface of the protrusion connection portion, the upper portion being the circumference of the lower surface of the upper member, such that the burr collecting groove is recessed upward, the burr collecting groove collecting the welding burr which is generated when the friction welding is performed and which is moved upward, thereby preventing the welding burr from being discharged and exposed to the upper portion of the valve body through the gap of the friction welding portion.

* * * * *